UNITED STATES PATENT OFFICE.

LUDWIG OTTO HELMERS, OF HAMBURG, GERMANY, ASSIGNOR TO THE ICHTHYOL GESELLSCHAFT, CORDES, HERMANNI & CO., OF SAME PLACE.

PROCESS OF OBTAINING AQUEOUS SOLUTIONS OF PHENOLS.

SPECIFICATION forming part of Letters Patent No. 574,421, dated January 5, 1897.

Application filed November 14, 1893. Serial No. 490,957. (No specimens.) Patented in Germany June 3, 1893, Nos. 76,133 and 80,260; in England October 26, 1893, No. 20,245; in France October 26, 1893, No. 233,662; in Belgium October 26, 1893, No. 106,919; in Italy December 31, 1893, No. 35,098, and in Austria-Hungary March 17, 1895, No. 56,910 and No. 33,153.

*To all whom it may concern:*

Be it known that I, LUDWIG OTTO HELMERS, a subject of the German Emperor, residing at Hamburg, in the German Empire, have invented certain new and useful Processes for Obtaining Aqueous Solutions of Phenols, (for which I have obtained Letters Patent in Great Britain, dated October 26, 1893, No. 20,245; in France, dated October 26, 1893, No. 233,662; in Belgium, dated October 26, 1893, No. 106,919; in Austria-Hungary, dated March 17, 1895, No. 56,910 and No. 83,153; in Italy, dated December 31, 1893, No. 35,098, and in Germany, Nos. 76,133 and 80,260, both dated June 3, 1893,) of which the following is a specification.

In the specification of my Letters Patent of the United States No. 525,784, dated September 11, 1894, I have described the purification of sulfonized carbon compounds obtained by the action of sulfuric acid or its substitutes on hydrocarbons and the separation of said sulfonized carbon compounds into sulfonic-acid salts *per se* soluble in water and into sulfone-like bodies *per se* insoluble in water. Among the sulfonized carbon compounds mentioned in the said Letters Patent are those of special importance which are gained by treating sulfureted hydrocarbons (containing at least five per cent. sulfur) with sulfuric acid or its substitutes, and which are known under the name of "ichthyol" and "thiol." As I have already stated in the above-mentioned Letters Patent, these substances are compositions of different bodies, and if they are treated according to the method described in the said Letters Patent two bodies are obtained, one of which, called in the said Letters Patent "sulfone-like body," is insoluble in water as well as in alcohol, but soluble in benzene. The other, called "sulfonic-acid compound," is not only soluble in water as the ichthyol or thiol, but also—and this is the difference between it and ichthyol and thiol—completely soluble in alcohol. It is, however, nearly insoluble in ether or benzene. The process of obtaining these two bodies from ichthyol and their respective properties I have fully described by an example in the above-mentioned Letters Patent No. 525,784. From these two bodies the sulfonic-acid compound possesses an eminent importance by the combinations which it forms with certain bodies insoluble in water. As already stated in my said Letters Patent No. 525,784, the sulfone-like body of ichthyol, though entirely insoluble in water, becomes readily soluble in water when combined with the sulfonic-acid compound of ichthyol, and it is this complete solubility that makes the ichthyol so gladly used as a therapeutic means.

Experimental attempts have now been made to clear up the question whether other bodies insoluble in water which are distinguished by their therapeutic properties could be combined with the sulfonic-acid compound of ichthyol or thiol in such a manner that a combination completely soluble in water is obtained.

Among other substances I turned my mind to the phenols, and I succeeded in obtaining combinations completely soluble in water, consisting of a phenol and the sulfonic-acid compound of ichthyol or thiol. These combinations are obtained by mixing or heating the phenol and the sulfonic-acid compound with a small quantity of water, or by dissolving the two bodies separately in a suitable solvent, as alcohol, then mixing them and distilling off the solvent afterward. The latter method may preferably be used when a solid phenol, such as thymol, is employed. In all other cases I prefer the first method. I generally prefer to apply a sulfonic-acid compound which is not dry or dried, but still contains about a third of its weight of water, and to combine about equal parts of this thick fluid mass and of the phenol either by simply mixing or by heating the ingredients for some time. The combination so obtained is a viscid brown product, smelling of phenol. It is clearly soluble in water in all proportions without the smallest separation of the phenol.

By the application of the described combination instead of the pure phenol the disinfecting, antiseptic, and curative properties of the phenol can be better utilized, since in the form of clear aqueous solution it can be distributed and applied at all events.

Having fully described my invention, what I claim, and desire to secure by Letters Patent, is—

1. The process of rendering soluble in water phenols by reacting upon them with a sulfonic-acid compound, which consists of a chemical combination of a sulfureted hydrocarbon containing at least five per cent. sulfur and of sulfuric acid, and which compound is completely soluble in water and alcohol, but nearly insoluble in ether, substantially as set forth.

2. As an article of manufacture the herein-described product clearly soluble in water, composed of a phenol and a sulfonic-acid compound, which latter consists of a chemical combination of a sulfureted hydrocarbon containing at least five per cent. sulfur and of sulfuric acid, and which compound is completely soluble in water and alcohol, but nearly insoluble in ether, substantially as specified.

In testimony that I claim the foregoing as my invention I have signed my name, in presence of two witnesses, this 31st day of October, 1893.

LUDWIG OTTO HELMERS.

Witnesses:
ALEXANDER SPECHT,
HARRY F. W. GIETHE.